US012682010B2

(12) United States Patent
Takeyama et al.

(10) Patent No.: US 12,682,010 B2
(45) Date of Patent: Jul. 14, 2026

(54) INFORMATION PROCESSING APPARATUS, INFORMATION PROCESSING METHOD, AND STORAGE MEDIUM FOR PERFORMING EMBEDDING ON DATA OF A GRAPH STRUCTURE

(71) Applicant: KABUSHIKI KAISHA TOSHIBA, Tokyo (JP)

(72) Inventors: Yasutoyo Takeyama, Kawasaki Kanagawa (JP); Yoshiyuki Kokojima, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 943 days.

(21) Appl. No.: 17/942,252

(22) Filed: Sep. 12, 2022

(65) Prior Publication Data

US 2023/0273975 A1    Aug. 31, 2023

(30) Foreign Application Priority Data

Feb. 25, 2022    (JP) ................................. 2022-028125

(51) Int. Cl.
| | |
|---|---|
| *G06F 18/213* | (2023.01) |
| *G06F 16/901* | (2019.01) |
| *G06F 18/20* | (2023.01) |
| *G06F 40/30* | (2020.01) |
| *G06N 3/082* | (2023.01) |

(52) U.S. Cl.
CPC ........ *G06F 18/213* (2023.01); *G06F 16/9027* (2019.01); *G06F 18/29* (2023.01); *G06F 40/30* (2020.01); *G06N 3/082* (2013.01)

(58) Field of Classification Search
CPC .... G06F 18/213; G06F 16/9027; G06F 18/29; G06F 40/30; G06F 40/237; G06F 16/9024; G06N 3/082; G06N 3/045; G06N 3/08
See application file for complete search history.

(56) References Cited

U.S. PATENT DOCUMENTS

| | | | |
|---|---|---|---|
| 11,809,841 B1 * | 11/2023 | Zhang ........................ | G06F 8/33 |
| 2010/0198799 A1 * | 8/2010 | Krishnan ............ | G06F 11/3696 |
| | | | 706/46 |

(Continued)

FOREIGN PATENT DOCUMENTS

| | | |
|---|---|---|
| JP | H9-282290 A | 10/1997 |
| JP | 2002-259479 A | 9/2002 |
| JP | 2021-120863 A | 8/2021 |

OTHER PUBLICATIONS

Chang et al. "A novel subcircuit extraction algorithm by recursive identification scheme" (Year: 2001).*

(Continued)

*Primary Examiner* — Reji Kartholy

(74) *Attorney, Agent, or Firm* — Finnegan, Henderson, Farabow, Garrett & Dunner, LLP

(57) ABSTRACT

In general, according to one embodiment, an information processing apparatus includes a processor. The processor includes hardware configured to extract a sub-graph that is a graph structure operating independently from data of an input graph structure including a plurality of nodes and an edge connecting the nodes, extract a path from the extracted sub-graph, and perform learning of an embedding model using the extracted path. The embedding model performs embedding on data of a graph structure.

6 Claims, 6 Drawing Sheets

(56)　　　　References Cited

U.S. PATENT DOCUMENTS

| 2011/0307507 | A1* | 12/2011 | Zhou | G06F 8/74 |
| | | | | 707/769 |
| 2021/0216717 | A1 | 7/2021 | Wang et al. | |
| 2022/0345535 | A1* | 10/2022 | Enrici | G06F 16/9027 |
| 2023/0088676 | A1* | 3/2023 | She | G06N 3/088 |
| | | | | 706/25 |
| 2023/0176838 | A1* | 6/2023 | Bronevetsky | G06F 8/71 |
| | | | | 717/110 |
| 2023/0214842 | A1* | 7/2023 | Giovannini | G06N 3/08 |
| | | | | 705/44 |

OTHER PUBLICATIONS

Z. Zhao et al., "Ngram2vec: Learning Improved Word Representations from Ngram Co-occurrence Statistics," Proc. of 2017 Conf. on Empirical Methods in Natural Language Processing, pp. 244-253 (2017).

T. Mikolov et al., "Efficient Estimation of Word Representations in Vector Space," arXiv:1301.3781v3 [cs.CL], 12 pages (2013).

B. Perozzi et al., "DeepWalk: Online Learning of Social Representations," arXiv:1403.6652v2 [cs.SI] , 10 pages (2014).

Japan Patent Office, Office Action in JP App. No. 2022-028125, 3 pages, and machine translation, 3 pages (Jan. 7, 2025).

* cited by examiner

1

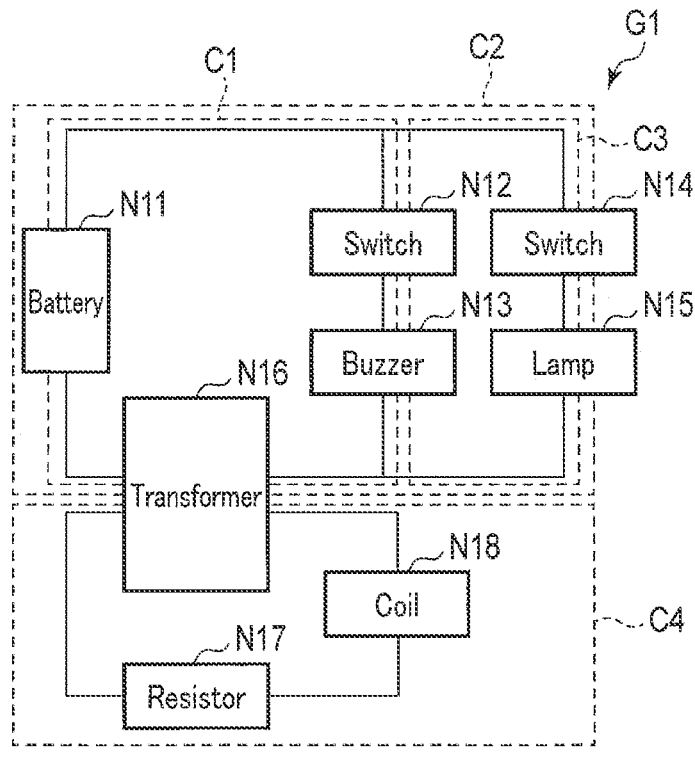
F I G. 4A

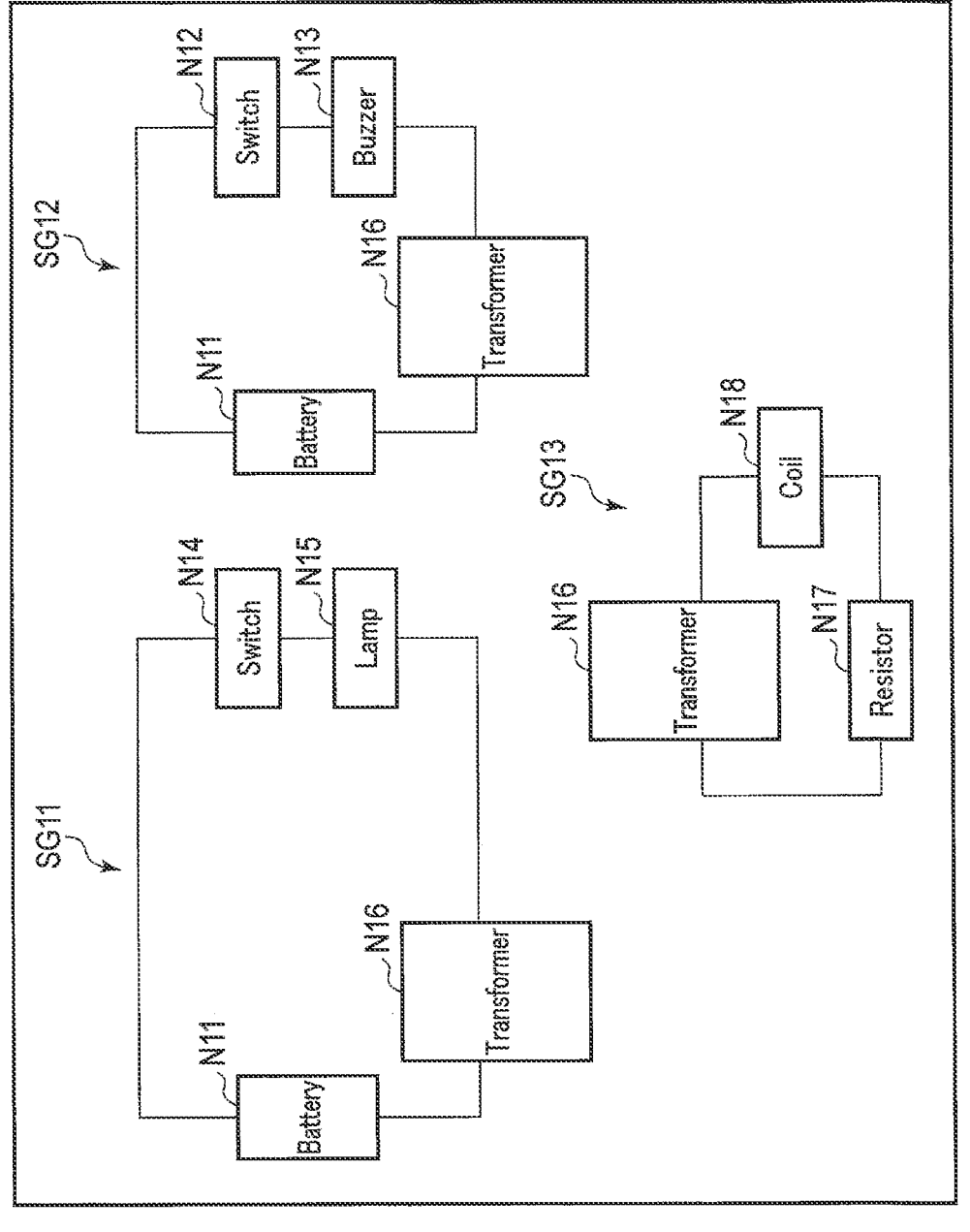
F I G. 4B

INFORMATION PROCESSING APPARATUS, INFORMATION PROCESSING METHOD, AND STORAGE MEDIUM FOR PERFORMING EMBEDDING ON DATA OF A GRAPH STRUCTURE

CROSS-REFERENCE TO RELATED APPLICATIONS

This application is based upon and claims the benefit of priority from the Japanese Patent Application No. 2022-028125, filed Feb. 25, 2022, the entire contents of which are incorporated herein by reference.

FIELD

Embodiments described herein relate generally to an information processing apparatus, an information processing method, and a storage medium.

BACKGROUND

A source code of a program can be converted into a graph structure by regarding units of processing as nodes and transitions of the units of processing as edges. Similarly, a design diagram of an electric circuit may be converted into a graph structure by regarding circuit parts as nodes and wiring between circuit parts as edges. By analyzing these graph structures, the features of the source code and the design diagram or each line of the source code and parts included in the design diagram can be quantified. Such quantification is called graph embedding or the like. In a case where graph embedding is performed by a machine learning model, a method of performing machine learning on a machine learning model using a path cut out from a graph structure has been established. Path extraction is a commonly used technique in natural language processing. Here, as compared with a natural language having a structure in which words are linearly arranged, a graph structure includes many nodes to which a plurality of edges are connected. The nodes to which the plurality of edges is connected become branch points in path extraction processing, and the number of paths is increased by the branch points. For example, when two nodes to which five edges are connected are connected by edges, there are 16 paths including these two nodes. Every time three or four nodes to which a plurality of edges is connected are connected, the number of paths increases exponentially. As described above, the number of paths tends to be large in the graph structure. Therefore, when the machine learning is performed using all the paths, the learning may not end in a realistic time.

BRIEF DESCRIPTION OF THE DRAWINGS

FIG. 4A is a diagram illustrating an example of data of a design diagram of an electric circuit converted into a graph structure input to the information processing apparatus.

FIG. 4B is a diagram illustrating an example of a sub-graph extracted from the data of the graph structure of FIG. 4A.

DETAILED DESCRIPTION

In general, according to one embodiment, an information processing apparatus includes a processor. The processor includes hardware configured to extract a sub-graph that is a graph structure operating independently from data of an input graph structure including a plurality of nodes and an edge connecting the nodes, extract a path from the extracted sub-graph, and perform learning of an embedding model using the extracted path. The embedding model performs embedding on data of a graph structure.

Figure 1:
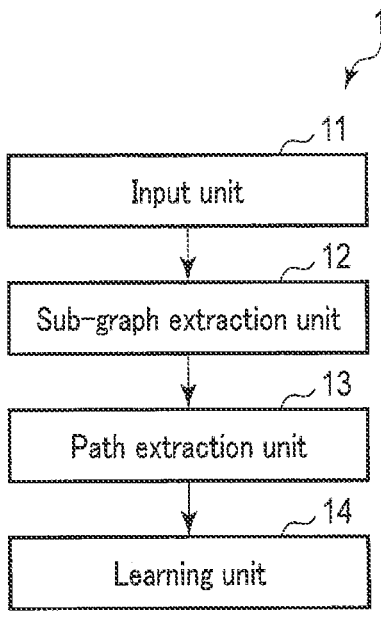
FIG. 1 is a block diagram illustrating a configuration of an information processing apparatus according to an embodiment.

Hereinafter, embodiments will be described with reference to the drawings. FIG. 1 is a block diagram illustrating a configuration of an information processing apparatus according to an embodiment. An information processing apparatus 1 includes an input unit 11, a sub-graph extraction unit 12, a path extraction unit 13, and a learning unit 14.

The input unit 11 receives an input of data of an input graph structure. A graph structure is a combination of nodes and edges representing a relationship between a plurality of things. A node is a vertex in a graph structure. An edge is a side connecting nodes. Each node includes information of an index number allocated to each node, a parameter held by each node, and an index number of an edge to be connected. Each edge includes information of an index number allocated to each edge and an index number of a node to be connected. The edge may be a directed edge including direction information, or may be an undirected edge not including direction information.

Here, the data of the input graph structure may be input in advance by the user. The data of the input graph structure in the embodiment includes, for example, data of a graph structure generated by regarding units of processing of a program as nodes and transitions of units of processing as edges. In addition, the data of the input graph structure in the embodiment includes data of a graph structure generated by regarding circuit parts of an electric circuit as nodes and wiring between circuit parts as edges.

The sub-graph extraction unit 12 receives data of the input graph structure from the input unit 11. Then, the sub-graph extraction unit 12 extracts a sub-graph from the data of the input graph structure. The sub-graph extraction unit 12 according to the embodiment extracts a sub-graph constituted by nodes and edges that operate independently. Operating independently means that the operation is completed only by the combination of the extracted nodes and edges.

The operation defined by the combination of the nodes and the edges included in the data of the graph structure includes an operation that does not actually operate effectively. For example, a source code of a program may include a lot of branch processing. However, it is rare that all combinations of branch processing results operate effectively. In a design diagram of an electric circuit or the like, a closed circuit including circuit parts that can operate as power has high reusability, and the closed circuit itself often has a role. On the other hand, when closed circuits are connected to each other, the closed circuits are often connected only to share power. For this reason, a combination of edges across a closed circuit is only connected for convenience of mounting, and it is difficult to represent the role and characteristics of the electric circuit.

In consideration of these circumstances, for example, when the data of the graph structure is data of a design diagram converted into a graph structure, the sub-graph extraction unit 12 extracts, for example, a closed circuit including parts that can operate as power as a sub-graph constituted by nodes and edges that operate independently. Similarly, for example, when the data of the graph structure is data of a source code of a program converted into a graph structure, the sub-graph extraction unit 12 extracts a flow of processing that operates effectively as a sub-graph constituted by nodes and edges that operate independently. The determination of the flow of processing that operates independently in the program may be performed by statically analyzing data of the graph structure, or may be performed by analyzing a record of an operation result obtained by virtually executing processing of the program represented by the graph structure.

The path extraction unit 13 extracts a path from the sub-graph extracted by the sub-graph extraction unit 12. The path is data of a graph structure that includes a predetermined number of nodes and does not include branches. The path extraction may be performed by any method. For example, the path extraction unit 13 randomly extracts a predetermined number of paths from the sub-graph.

The learning unit 14 learns an embedding model by using the path extracted by the path extraction unit 13. The embedding model is a model learned to convert data of each node of input data of a graph structure into an embedding vector according to the features of the data of the graph structure. The embedding model may be, for example, a word2vec (MIKOLOV, Tomas, et al. Efficient estimation of word representations in vector space-arXiv: preprint arXiv: 1301.3781, 2013) model. In this case, the embedding model calculates the role and meaning of each node in the data of the graph structure by applying a method of regarding a path as a part of a natural language sentence and a node as a natural language word and calculating the role and meaning of the word by machine learning, and converts each node into an embedding vector according to the calculated role and meaning. Note that the embedding model does not have to be word2vec, and may be ngram2vec (ZHAO, Zhe, et al. Ngram2vec: Learning improved word representations from ngram co-occurrence statistics. In: Proceedings of the 2017 conference on empirical methods in natural language processing. 2017. p. 244-253.) or the like. In the case of ngram2vec, an embedding vector can be calculated not only for a single node but also for a connection of a plurality of nodes.

Figure 2:
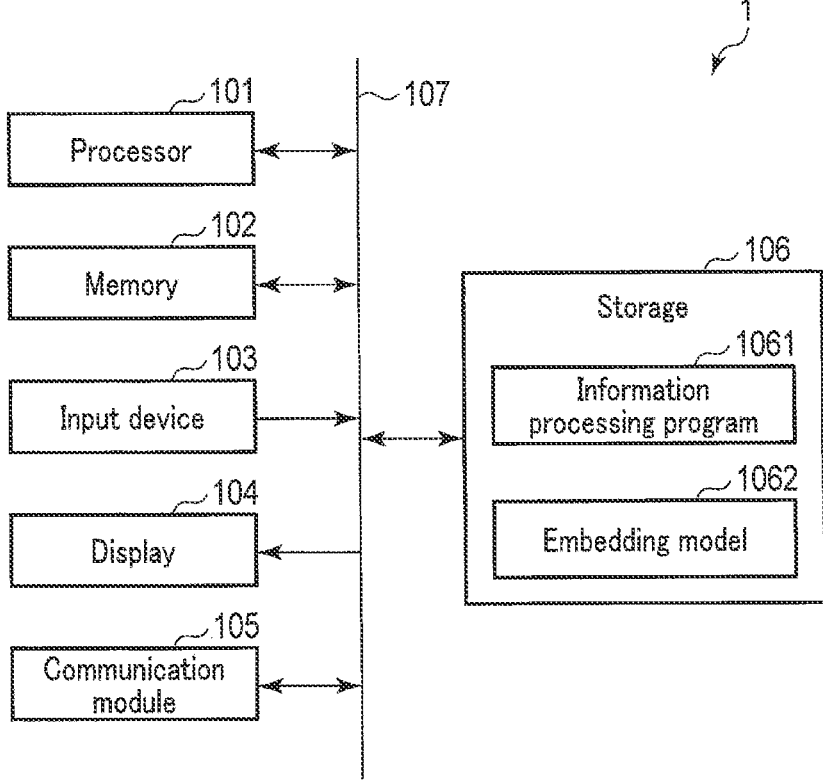
FIG. 2 is a diagram illustrating an example of a hardware configuration of the information processing apparatus.

FIG. 2 is a diagram illustrating an example of a hardware configuration of the information processing apparatus 1. The information processing apparatus 1 includes, for example, a processor 101, a memory 102, an input device 103, a display 104, a communication module 105, and a storage 106 as hardware. The processor 101, the memory 102, the input device 103, the display 104, the communication module 105, and the storage 106 are connected to a bus 107. The information processing apparatus 1 may be a terminal device such as a personal computer (PC), a smartphone, or a tablet terminal. However, the information processing apparatus 1 may be incorporated in an arbitrary apparatus. Furthermore, the information processing apparatus 1 does not have to include all of the elements illustrated in FIG. 2. For example, the information processing apparatus 1 does not have to include the display 104 and the communication module 105.

The processor 101 is a processor that controls the overall operation of the information processing apparatus 1. The processor 101 operates as the input unit 11, the sub-graph extraction unit 12, the path extraction unit 13, and the learning unit 14, for example, by executing a program stored in the storage 106. The processor 101 is, for example, a central processing unit (CPU). The processor 101 may be a micro processing unit (MPU), a graphics processing unit (GPU), an application specific integrated circuit (ASIC), a field programmable gate array (FPGA), or the like. The processor 101 may be a single CPU or the like, or may be a plurality of CPUs or the like.

The memory 102 includes a read only memory (ROM) and a random access memory (RAM). The ROM is a nonvolatile memory. The ROM stores a startup program and the like of the information processing apparatus 1. The RAM is a volatile memory. The RAM is used as a working memory at the time of processing in the processor 101, for example.

The input device 103 is an input device such as a touch panel, a keyboard, or a mouse. When the input device 103 is operated, a signal corresponding to the operation content is input to the processor 101 via the bus 107. The processor 101 performs various kinds of processing according to the signal. The input device 103 can be used to input data of an input graph structure, for example.

The display 104 is a display such as a liquid crystal display or an organic electro luminescence (EL) display. The display 104 displays various images. The display 104 displays an image such as data of a graph structure and a result of embedding, for example.

The communication module 105 is a communication module for the information processing apparatus 1 to communicate with an external device. The communication module 105 may be a communication module for wired communication or a communication module for wireless communication.

The storage 106 is, for example, a storage such as a hard disk drive or a solid state drive. The storage 106 stores an information processing program 1061 executed by the processor 101 such as an information processing program. Furthermore, the storage 106 may store an embedding model 1062. The embedding model 1062 is not necessarily stored in the storage 106. For example, the embedding model 1062 may be stored in a storage outside the information processing apparatus 1. In this case, the information processing apparatus 1 acquires necessary information by accessing the outside storage using the communication module 105.

The bus 107 is a data transfer path for exchanging data among the processor 101, the memory 102, the input device 103, the display 104, the communication module 105, and the storage 106.

Figure 3:
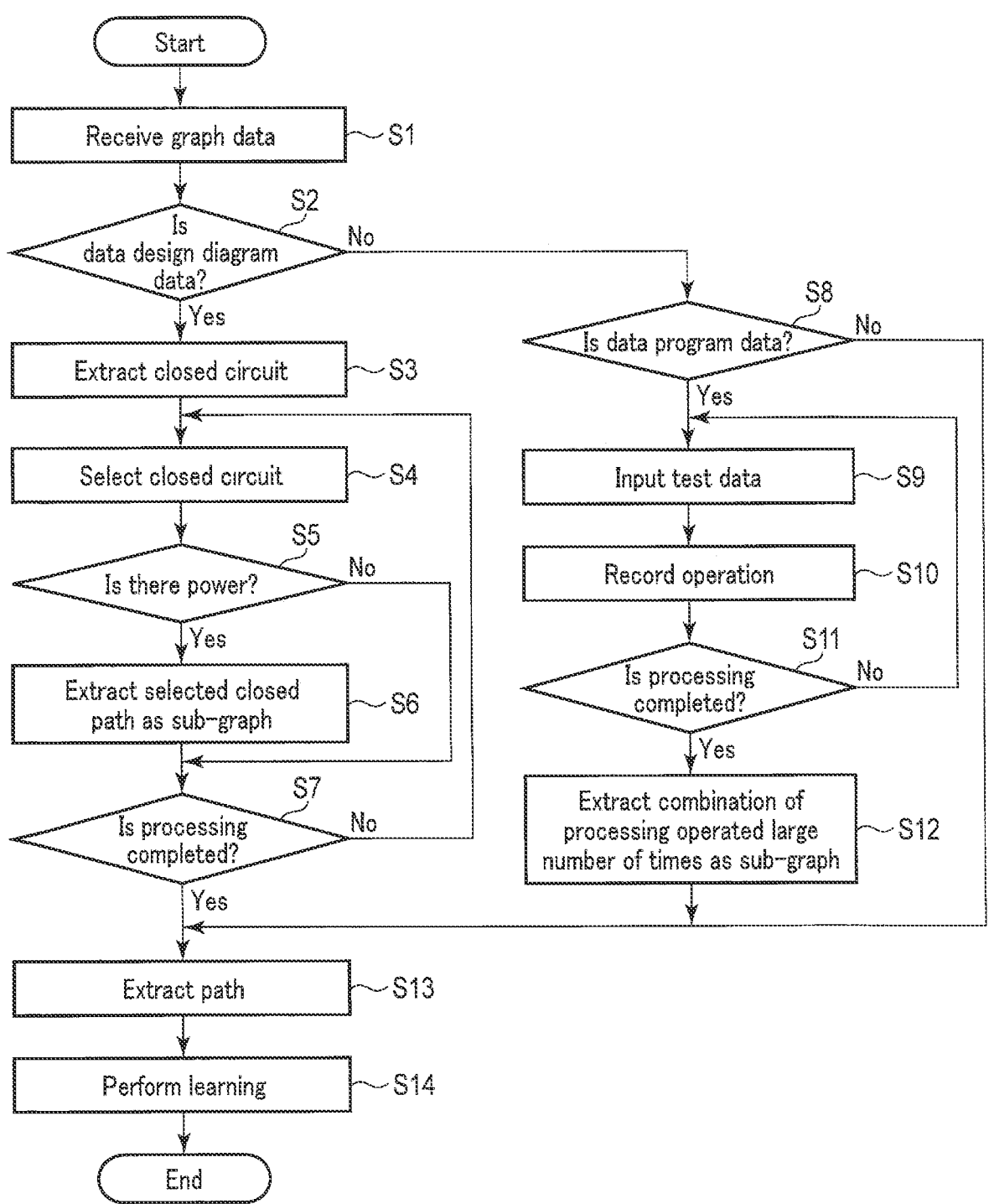
FIG. 3 is a flowchart illustrating an information processing method by the information processing apparatus.

Next, the operation of the information processing apparatus 1 will be described. FIG. 3 is a flowchart illustrating an information processing method by the information processing apparatus 1. The processing of FIG. 3 is executed by the processor 101.

In step S1, the processor 101 acquires data of an input graph structure. As described above, data of an input graph structure may be input by the user. For example, the user operates the input device 103 to input the data of the input graph structure.

In step S2, the processor 101 determines whether or not the data of the input graph structure is data of a design diagram of an electric circuit converted into a graph structure or the like. For example, when an identifier indicating that the data of the input graph structure is data of a design diagram is given to the data of the input graph structure, the processor 101 can determine whether the data of the input graph structure is data of a design diagram of an electric circuit converted into a graph structure or the like from the identifier. In addition, it may be determined whether or not the data of the input graph structure is data of a design diagram of an electric circuit converted into a graph structure or the like by an arbitrary method such as a method of determining from a label attached to a node. When it is determined in step S2 that the data of the input graph structure is data of a design diagram of an electric circuit converted into a graph structure or the like, the processing proceeds to step S3. When it is determined in step S2 that the data of the input graph structure is not data of a design diagram of an electric circuit converted into a graph structure or the like, the processing proceeds to step S8.

In step S3, the processor 101 extracts one or more closed circuits in the data of the input graph structure. A closed circuit is a path in which nodes of a start point and an end point coincide with each other. For example, a closed circuit can be searched for from the information of the connection destination of each of the nodes and the edges. After extracting the closed circuit, the processor 101 stores the data of the graph structure of the extracted closed circuit in, for example, the memory 102.

In step S4, the processor 101 selects one of the extracted closed circuits.

In step S5, the processor 101 determines whether or not a node of a part that can operate as power is included in the selected closed circuit. The part that can operate as power is a circuit part that supplies power to each circuit part in an electric circuit such as a power supply in a design diagram of an electric circuit. In addition, in a design diagram of an electric circuit, the power may also include a circuit part such as a transformer that supplies power transmitted from another electric circuit to another circuit part in the closed circuit. In addition, the part that can operate as power may include an engine or the like in a design diagram of a machine. Information on a part that can operate as power is registered in the storage 106, for example. The processor 101 determines whether each node is a node including a part that can operate as power by comparing information of a label associated with each node of the selected closed circuit with information of a part that can operate as power registered in the storage 106. When it is determined in step S5 that a node of a part that can operate as power is included in the selected closed circuit, the processing proceeds to step S6. When it is determined in step S5 that a node of a part that can operate as power is not included in the selected closed circuit, the processing proceeds to step S7.

In step S6, the processor 101 extracts the selected closed circuit as a sub-graph. Then, the processor 101 stores the extracted sub-graph in, for example, the storage 106. Thereafter, the processing proceeds to step S7.

In step S7, the processor 101 determines whether or not the processing for all the extracted closed circuits is completed. When it is determined in step S7 that the processing for all the extracted closed circuits is not completed, the processing returns to step S4. In this case, the processor 101 selects another closed circuit and continues the processing. When it is determined in step S7 that the processing for all the extracted closed circuits is completed, the processing proceeds to step S13.

Here, the processing of steps S3 to S7 will be specifically described with reference to FIGS. 4A and 4B. FIG. 4A is a diagram illustrating an example of data of a design diagram of an electric circuit converted into a graph structure input to the information processing apparatus 1. A graph structure G1 illustrated in FIG. 4A includes eight nodes N11 to N18. Each node is associated with a label representing a name of a circuit part. For example, a label "battery" is associated with the node N11. Similarly, a label "switch" is associated with the node N12, a label of "buzzer" is associated with the node N13, a label "switch" is associated with the node N14, a label "lamp" is associated with the node N15, a label "transformer" is associated with the node N16, a label "resistor" is associated with the node N17, and a label "coil" is associated with the node N18.

First, a closed circuit is extracted from the graph structure illustrated in FIG. 4A. As described above, a closed circuit is a graph structure in which nodes of a start point and an end point coincide with each other. Four closed circuits C1, C2, C3, and C4 are extracted from the graph structure G1 of FIG. 4A. The closed circuit C1 has, for example, a graph structure that returns from the node N11 to the node N11 via the node N12, the node N13, and the node N16. The closed circuit C2 has, for example, a graph structure that returns from the node N11 to the node N11 via the node N14, the node N15, and the node N16. The closed circuit C3 has, for example, a graph structure that returns from the node N12 to the node N12 via the node N14, the node N15, and the node N13. The closed circuit C4 has, for example, a graph structure that returns from the node N16 to the node N16 via the node N18 and the node N17. In the embodiment, the closed circuits C1, C2, C3, and C4 may be candidates for sub-graphs.

Subsequently, the presence or absence of a power node is determined for each closed circuit. For the closed circuit C1, since the node N11 is a "battery" node, it is determined that there is power. Similarly, for the closed circuit C2, since the node N11 is a "battery" node, it is determined that there is power. In addition, for the closed circuit C4, although a "battery" node is not included, since the node N16 connected to the closed circuit including a battery is a node of the "transformer", it is determined that there is power. On the other hand, since the closed circuit C3 does not include a "battery" node and a node that can be another power, it is determined that there is no power.

Subsequently, a closed circuit including a power node is extracted as a sub-graph. As a result, as illustrated in FIG. 4B, a sub-graph SG11 having a graph structure of the closed circuit C2, a sub-graph SG12 having a graph structure of the closed circuit C1, and the sub-graph SG13 having a graph structure of the closed circuit C4 are extracted. On the other hand, the closed circuit C3 is not extracted as a sub-graph. An electric circuit without power such as the closed circuit C3 is an electric circuit that does not operate independently. Such an electric circuit that does not operate independently is often not useful in analysis. Therefore, in the embodiment, the graph structure of such an electric circuit that does not operate independently is not extracted as a sub-graph.

Here, the description returns to FIG. 3. In a case where it is determined in step S2 that the data of the input graph structure is not data of a design diagram of an electric circuit converted into a graph structure or the like, in step S8, the processor 101 determines whether or not the data of the input graph structure is data of a source code of a program converted into a graph structure. As in step S2, the determination as to whether the data of the input graph structure is data of a source code of a program converted into a graph structure may be performed by an arbitrary method. When it is determined in step S8 that the data of the input graph structure is data of a source code of a program converted into a graph structure, the processing proceeds to step S9. When it is determined in step S8 that the data of the input graph structure is not data of a source code of a program converted into a graph structure, the processing proceeds to step S13.

In step S9, by inputting test data to the program converted into a graph structure, the processor 101 virtually executes processing of the program. A plurality of pieces of test data is prepared in advance for each program, and is registered in the storage 106, for example.

In step S10, the processor 101 records the operation result of the program in the storage 106, for example. The operation result of the program includes information on a node corresponding to processing operated by execution of a virtual program. For example, the processor 101 records the operation result of the program in, for example, the storage 106 from a log obtained by executing a virtual program.

In step S11, the processor 101 determines whether the processing using all the test data is completed. In a case where it is determined in step S11 that the processing using all the test data is not completed, the processing returns to step S9. In this case, the processor 101 inputs another test data and continues the processing. In a case where it is determined in step S11 that the processing using all the test data is completed, the processing proceeds to step S12.

In step S12, the processor 101 refers to the operation result of the program recorded in the storage 106, for example, and extracts, as a sub-graph, a combination of processing operated a large number of times. Thereafter, the processing proceeds to step S13. The threshold of the number of times of operation may be any integer greater than or equal to 1. As the threshold of the number of times of operation increases, there is a high possibility that the number of combinations of processing extracted as a sub-graph decreases.

Figure 5A:
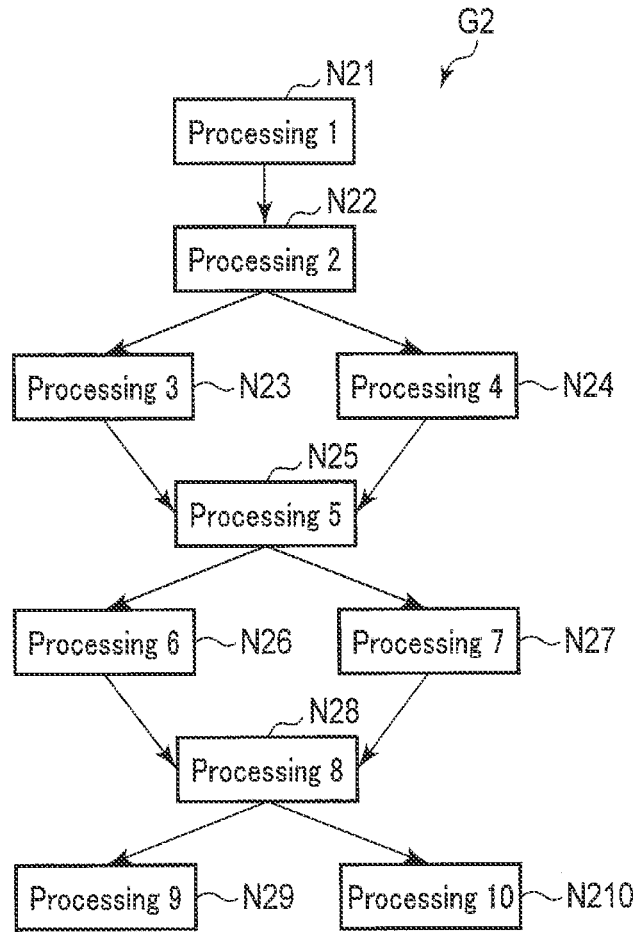
FIG. 5A is a diagram illustrating an example of data of a source code of a program converted into a graph structure input to the information processing apparatus.
Figure 5B:
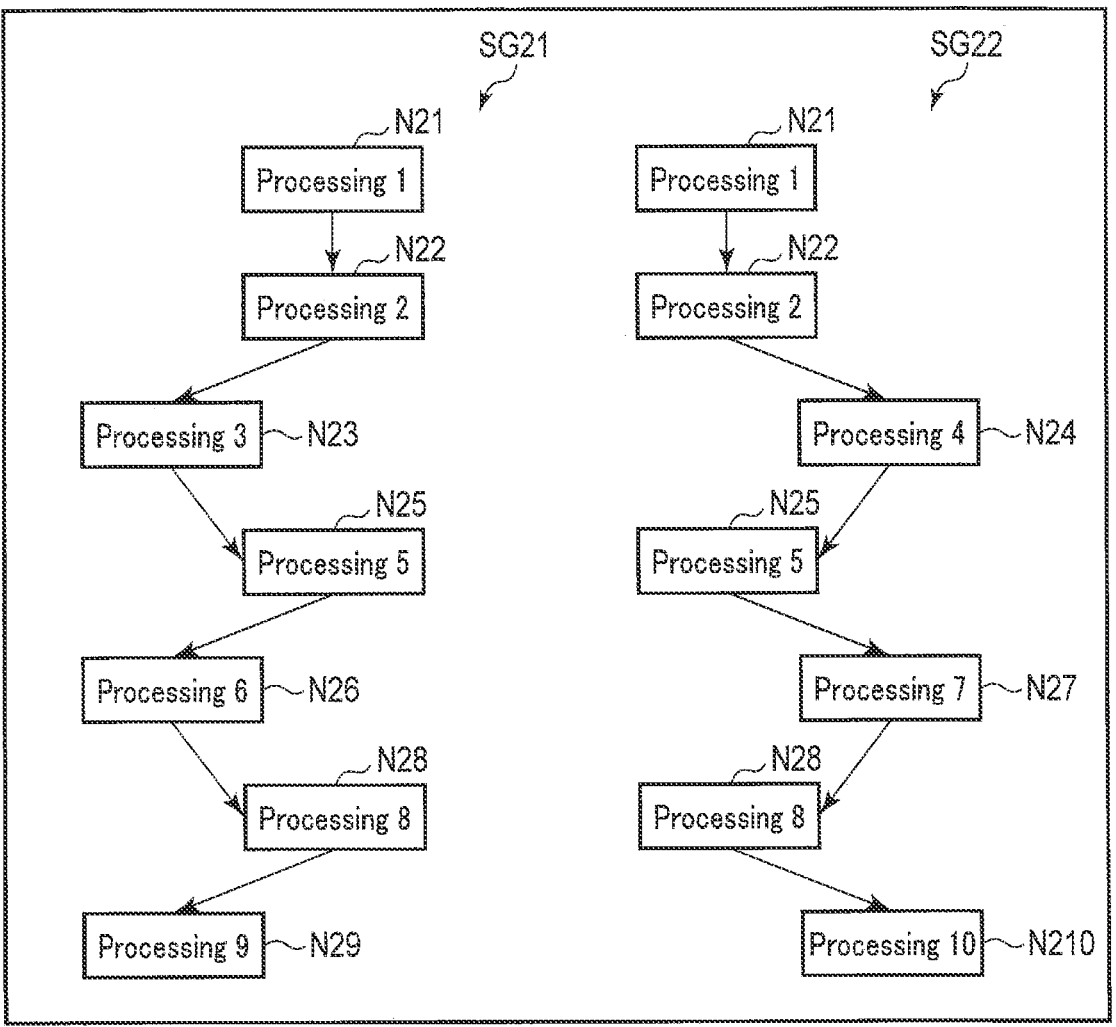
FIG. 5B is a diagram illustrating an example of a sub-graph extracted from the data of the graph structure of FIG. 5A.

Here, the processing of steps S9 to S12 will be specifically described with reference to FIGS. 5A and 5B. FIG. 5A is a diagram illustrating an example of data of a source code of a program converted into a graph structure input to the information processing apparatus 1. A graph structure G2 illustrated in FIG. 5A includes 10 nodes N21 to N210. Each node is associated with a label representing the content of processing. For example, a label "processing 1" is associated with the node N21. Here, "processing 2" of the node N22, "processing 5" of the node N25, and "processing 8" of the node N28 are branch processing. Therefore, the program illustrated in FIG. 5A can perform eight types of operations according to the input data. In the embodiment, each of these eight types of operations can be a candidate for a sub-graph.

A plurality of pieces of test data is input to the program illustrated in FIG. 5A, and information on a node corresponding to operated processing is recorded. Then, a combination of processing operated a large number of times is specified. For example, it is assumed that a combination of "processing 1", "processing 2", "processing 3", "processing 5", "processing 6", "processing 8", and "processing 9" and a combination of "processing 1", "processing 2", "processing 4", "processing 5", "processing 7", "processing 8", and "processing 10" are combinations of processing operated a large number of times.

Subsequently, a combination of processing operated a large number of times is extracted as a sub-graph. As a result, as illustrated in FIG. 5B, a sub-graph SG21 having a graph structure including the nodes N21, N22, N23, N25, N26, N28, and N29 and a sub-graph SG22 having a graph structure including the nodes N21, N22, N24, N25, N27, N28, and N210 are extracted. On the other hand, a combination of other processing is not extracted as a sub-graph. A combination of less active processing is often not useful in analysis. Therefore, in the embodiment, the graph structure of such a combination of less active processing is not extracted as a sub-graph. Note that, if the threshold of the number of times of operation is 1, a combination of processing that is not extracted as a sub-graph is a combination of processing that does not operate at all.

Here, the description returns to FIG. 3. In step S13, the processor 101 extracts a path from data of a graph structure. As described above, the path extraction may be performed by any method. For example, a method of randomly extracting a predetermined number of paths from a graph structure may be used. In a case where a sub-graph is extracted in the pre-processing, the path extracted in step S13 is expected to be a path useful in learning.

In step S14, the processor 101 inputs the data of the graph structure of the extracted path to the embedding model 1062 and learns the embedding model 1062. Thereafter, the processing of FIG. 3 ends.

As described above, according to one embodiment, the information processing apparatus 1 extracts, as a sub-graph, data of a graph structure that operates independently among the input data of the graph structure. Then, the information processing apparatus 1 extracts a path from the sub-graph and learns the embedding model 1062 using the extracted path. That is, in the embodiment, it is expected that useless paths that are not useful in learning are reduced in the paths used for learning the embedding model 1062. As a result, effective learning can be performed even when the number of paths is small. In addition, since the number of paths is reduced, completion of learning in a realistic time is expected.

Here, in the embodiment, examples of a method for extracting data of a graph structure that operates independently among data of the graph structure as a sub-graph include a method for extracting a closed circuit including power in a design diagram of an electric circuit or the like, and a method for extracting a combination of processing that operates when test data is input to a program. Data of a graph structure that operates independently may be extracted by a method other than these methods. In this case, the data of the graph structure is not necessarily data of a design diagram such as an electric circuit or data of a source code of the program.

Here, the instructions illustrated in the processing procedure illustrated in the above-described embodiment can be executed based on a program that is software. By storing the program in advance and reading the program, a general-purpose computer system can obtain an effect similar to the effect of the information processing apparatus described above. The instructions described in the above-described embodiment are recorded in a magnetic disk (flexible disk, hard disk, etc.), an optical disk (CD-ROM, CD-R, CD-RW, DVD-ROM, DVD±R, DVD±RW, Blu-ray (registered trademark) Disc, and the like), a semiconductor memory, or a recording medium similar thereto as a program that can be executed by a computer. The storage format may be any form as long as it is a recording medium readable by a computer or an embedded system. When the computer reads a program from the recording medium and causes the CPU to execute an instruction described in the program based on the program, the same operation as that of the information processing apparatus according to the above-described embodiment can be realized. Of course, when the computer acquires or reads a program, the program may be acquired or read through a network.

In addition, an operating system (OS) running on a computer based on an instruction of a program installed from a recording medium to a computer or an embedded system, database management software, middleware (MW) such as a network, or the like may execute a part of each processing for realizing the present embodiment.

Furthermore, the recording medium in the present embodiment is not limited to a medium independent of a computer or an embedded system, and includes a recording medium that downloads and stores or temporarily stores a program transmitted via a LAN, the Internet, or the like.

In addition, the number of recording media is not limited to one, and a case where the processing in the present embodiment is executed from a plurality of media is also included in the recording media in the present embodiment, and the configuration of the media may be any configuration.

Note that the computer or the embedded system in the present embodiment is for executing each processing in the present embodiment based on a program stored in a recording medium, and may have any configuration such as a device including one of a personal computer, a microcomputer, and the like, a system in which a plurality of devices is connected to a network, and the like.

In addition, the computer in the present embodiment is not limited to a personal computer, and includes an arithmetic processing device, a microcomputer, and the like included in an information processing device, and collectively refers to a device and an apparatus capable of realizing a function in the present embodiment by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processor including hardware configured to
extract a sub-graph that is a graph structure from data of an input graph structure, wherein the input graph structure includes a plurality of nodes and a plurality of edges connecting the nodes, the sub-graph is constituted by a combination of extracted nodes and edges that are extracted from the input graph structure, and an operation of the sub-graph is completed only by the combination of extracted nodes and edges,
extract a path from the extracted sub-graph,
input data of a graph structure of the extracted path to an embedding model, and
perform learning of the embedding model using the extracted path such that the embedding model performs embedding on the data of the graph structure of the extracted path,
wherein the data of the input graph structure is data of a source code of a program, and the processor is configured to:
input test data to the Program represented by the data of the input graph structure,
record information on a combination of nodes corresponding to processing of the program operated by the input test data, and extract, as the sub-graph, a combination of the nodes that were operated a number of times greater than a threshold.

2. The information processing apparatus according to claim 1, wherein the processor
extracts one or more closed circuits in data of the input graph structure,
determines presence or absence of a node representing a power supply for each extracted closed circuit, and
extracts, as the sub-graph, a graph structure having the node representing the power supply.

3. The information processing apparatus according to claim 1, wherein
the processor randomly extracts a predetermined number of the paths from the sub-graph.

4. The information processing apparatus according to claim 1, wherein
the embedding model is a model of word2vec or a model of ngram2vec.

5. An information processing method comprising:
extracting a sub-graph that is a graph structure from data of an input graph structure, wherein the input graph structure includes a plurality of nodes and a plurality of edges connecting the nodes, the sub-graph is constituted by a combination of extracted nodes and edges that are extracted from the input graph structure, and an operation of the sub-graph is completed only by the combination of extracted nodes and edges,
extracting a path from the extracted sub-graph,
inputting data of a graph structure of the extracted path to an embedding model, and
performing learning of the embedding model using the extracted path such that the embedding model performs embedding on the data of the graph structure of the extracted path,
wherein the data of the input graph structure is data of a source code of a program, and the method comprises:
inputting test data to the program represented by the data of the input graph structure,
recording information on a combination of nodes corresponding to processing of the program operated by the input test data, and
extracting, as the sub-graph, a combination of the nodes that were operated a number of times greater than a threshold.

6. A non-transitory computer-readable storage medium storing a computer-readable information processing program for causing a computer to execute
extracting a sub-graph that is a graph structure from data of an input graph structure, wherein the input graph structure includes a plurality of nodes and a plurality of edges connecting the nodes, the sub-graph is constituted by a combination of extracted nodes and edges that are extracted from the input graph structure, and an operation of the sub-graph is completed only by the combination of extracted nodes and edges,
extracting a path from the extracted sub-graph,
input data of a graph structure of the extracted path to an embedding model, and
performing learning of the embedding model using the extracted path such that the embedding model forms embedding on the data of the graph structure of the extracted path,
wherein the data of the input graph structure is data of a source code of a program, and the computer is caused to execute:

inputting test data to the program represented by the data of the input graph structure, recording information on a combination of nodes corresponding to processing of the program operated by the input test data, and extracting, as the sub-graph, a combination of the nodes that were operated a number of times greater than a threshold.

* * * * *